United States Patent [19]

Howard et al.

[11] 4,340,651
[45] Jul. 20, 1982

[54] CATHODE MATERIAL AND HIGH CAPACITY LITHIUM-IODINE CELLS

[75] Inventors: William G. Howard, Roseville; John C. Strohkirch, New Brighton; Marilyn A. Pehl, Anoka, all of Minn.

[73] Assignee: Medtronic, Inc., Minneapolis, Minn.

[21] Appl. No.: 205,904

[22] Filed: Nov. 12, 1980

[51] Int. Cl.³ .................. H01M 4/36; H01M 6/00
[52] U.S. Cl. .................. 429/101; 429/213
[58] Field of Search .......... 429/213, 218, 212, 101, 429/191, 199; 252/426

[56] References Cited

U.S. PATENT DOCUMENTS

| | | | |
|---|---|---|---|
| 3,660,163 | 5/1972 | Moser | 429/213 X |
| 3,674,562 | 7/1972 | Schneider et al. | 429/213 X |
| 3,773,557 | 11/1973 | Mead | 429/186 |
| 3,817,791 | 6/1974 | Greatbatch et al. | 429/101 |
| 3,874,929 | 4/1975 | Greatbatch | 429/218 X |
| 3,895,962 | 7/1975 | Mead | 29/623.1 |
| 3,944,433 | 3/1976 | Mead et al. | 429/213 |
| 3,957,533 | 5/1976 | Mead et al. | 429/213 |
| 3,969,142 | 7/1976 | Greatbatch et al. | 429/159 |
| 3,969,143 | 7/1976 | Mead et al. | 429/179 |
| 4,071,662 | 1/1978 | Mead et al. | 429/218 X |
| 4,148,975 | 4/1979 | Schneider et al. | 429/213 X |
| 4,157,433 | 6/1979 | Phillips | 429/213 X |
| 4,182,798 | 1/1980 | Skarstadt | 429/213 |
| 4,223,110 | 9/1980 | Phillips et al. | 429/213 X |

Primary Examiner—Anthony Skapars
Attorney, Agent, or Firm—Schroeder, Siegfried, Vidas, Steffey & Arrett

[57] ABSTRACT

Lithium-iodine cells with cathode having more than about 97% $I_2$ (by weight) and less than about 2.5% (by weight) poly (2-vinylpyridine) prepared in the conventional manner.

14 Claims, 3 Drawing Figures

4,340,651

CATHODE MATERIAL AND HIGH CAPACITY LITHIUM-IODINE CELLS

I. DESCRIPTION

Background of the Invention

This invention is concerned with cathode material of the iodine-poly(2-vinylpyridine) type containing extra amounts of iodine i.e., more than is ordinarily included in conventionally prepared materials of this kind. It has been determined that the improved material of the invention functions as well as the more conventional materials of lower iodine amount in terms of impedance or resistance and manufacturability; yet the improved material provides increased capacity and longer life as compared to conventionally prepared material.

The conventional preparation of iodine-poly(2-vinylpyridine) cathode material involves heating the constituents at various temperatures and times. Generally speaking, the temperatures range from about 93° C. (200° F.) to 150° C. (300° F.) and the time of heating may range from hours to days. In this connection, reference is made to the Mead U.S. Pat. No. 3,895,962 (assigned to Wilson Greatbatch, Ltd.), column 4, lines 20–22, wherein it is stated " . . . . The heat reaction in this instance is in the order of about 200° to 300° F., preferably 250° F."

Similarly, the Greatbatch et al. U.S. Pat. No. 3,817,791 (assigned to Wilson Greatbatch, Ltd.) states that the cathode material is heated " . . . to a temperature greater than the crystallization temperature of iodine . . . ". Other U.S. patents (also assigned to Wilson Greatbatch, Ltd.) make similar statements concerning heating of the cathode material during its preparation: Mead U.S. Pat. No. 3,773,557; Greatbatch U.S. Pat. No. 3,874,929; Mead et al. U.S. Pat. No. 3,944,433; Mead et al. U.S. Pat. No. 3,957,533; Greatbatch et al. U.S. Pat. No. 3,969,142; and Mead et al. U.S. Pat. No. 3,969,143.

Greatbatch points out in his paper entitled "The Evolution of Power Sources For Biomedical Implantable Applications" which was delivered to The Electrochemical Society and forms part of the *Proceedings of the Symposium on Power Sources for Biomedical Implantable Applications,* dated Oct. 14–19, 1979, that cathode materials may be prepared from mixtures of iodine and poly(2-vinylpyridine) by mixing the components together and holding them at 300° C. (°F. believed to be intended) for 3 days. The ratio described for iodine to poly(2-vinylpyridine) by weight ranges from 10:1 to 20:1 by weight i.e., up to about 95.2% by weight iodine.

Phillips and Untereker point out in their paper entitled "Phase Diagram for the Poly-2-vinylpyridine and Iodine System", which was presented to The Electrochemical Society and which is part of the *Proceedings of the Symposium on Power Sources for Biomedical Implantable Applications,* dated Oct. 14–19, 1979, that ordinary preparation conditions for iodine-poly(2-vinylpyridine) cathode materials involves heating at 150° C. (300° F.) for 24 hours. See "Sample Preparation" page 199 of that paper in the Symposium Proceedings.

Utilizing the conditions as pointed out above for preparing the cathode materials, it has become generally accepted in the art that there is an upper limit on the amount of iodine which can be included in the cathode material. Generally speaking, this limit has been about 20:1 by weight i.e., about 95.2% by weight iodine for commercially produced cells although recently a weight ratio as high as 30:1 has been introduced commercially.

This limitation is evidenced by U.S. Pat. No. 3,660,163 to Moser which discloses iodine-poly(2-vinylpyridine) cathode materials and states at Column 3, lines 14 et seq. that "high proportion of uncomplexed iodine in the cathode generally increases internal cell resistance." Several organic complexes with iodine are disclosed. Insofar as poly(2-vinylpyridine).$I_2$ complexes are concerned, the patent discloses, in Example VII, only 93.2% by weight iodine (complexed and uncomplexed i.e., overall iodine) -6.8% poly(2-vinylpyridine) compositions. The related Schneider et al. U.S. Pat. No. 3,674,562 utilizes as an upper limit 36.3:1 iodine:poly(2-vinylpyridine) by weight ratio (i.e., 15 molecules of iodine for each atom of pyridine nitrogen). Another related Schneider et al. U.S. Pat. No. 4,148,975 describes iodine ratios of 15:1 to 26:1 i.e., about 95–96% by weight iodine.

The Greatbatch et al. U.S. Pat. No. 3,817,791 points out generally that the amount of iodine added should be greater than about 50% by weight of the resulting mixture so that enough iodine is available in the cathode material to provide sufficient conductivity for proper cell operation. The amount of iodine added, however, should not be so excessive as to interfere with surface contact between the lithium anode and the cathode material by iodine recrystallization.

A paper co-authored by Schneider and Kulp, dated January-February, 1977 and entitled "The Lithium Iodine Cell-A History", which appeared in *Medical Electronics and Data* describes cells jointly constructed by Catalyst Research Corporation and Wilson Greatbatch, Ltd. wherein the weight ratio was 16:1 i.e., less than about 95% by weight iodine. Catalyst Research Corporation later manufactured cells of lower iodine content wherein the weight ratio was as low as 10:1.

Greatbatch and Mead of Wilson Greatbatch, Ltd. and Schneider of Catalyst Research Corporation co-authored a paper entitled "Performance Characteristics of a Long Life Pacemaker Cell" which was presented at the *Proceedings of the* 9th International Symposium in September of 1974 wherein it is stated that 7–24 parts iodine with one part polymer were utilized in making iodine-poly(2-vinylpyridine) cathode material. This paper points out that the molecular weight of the polymer had an average molecular weight of 1300. Greatbatch points out in his paper "The Evolution of Power Sources for Biomedical Implantable Applications" (mentioned above) that ratios of 10:1 to 20:1 by weight iodine are typical i.e., less than about 95% by weight iodine.

The McLean and Bleecher paper entitled "Halogen Induced Modification of Poly-2-vinylpyridine During Lithium-Halogen Battery Life" presented at *Power Sources for Biomedical Implantable Applications and Ambient Temperature Lithium Batteries Symposium,* Proceedings Volume 80-4, describes at page 208 thereof another heating procedure for preparing iodine-poly(2-vinylpyridine) cathode materials wherein the components are heated at about 126.7° C. (260° F.) for about 24 hours followed by a 24 hour heating period at 150° C. (300° F.). This is believed to be a preferred conventional heating procedure at the present time.

Insofar as can be determined, only one effort has been made to incorporate greater amounts of iodine in the polymeric cathode material. This effort is described in the Phillips U.S. Pat. No. 4,157,433 wherein temperatures above 300° F. i.e., 150° C. are utilized to increase the material conductivity so that excessive amounts of iodine may be added without degrading conductivity to a lower than useful value. It should be noted, however, that the Phillips Patent discloses preparations at temperatures in excess of about 300° F. (150° C.) in order to accomplish this end.

It is known in the art that various molecular weights of poly(2-vinylpyridine) may be used to form the cathode material. Schneider points out in his paper entitled "The Lithium-Iodine Pacemaker Cell", delivered to the Electrochemical Society and forming part of the *Proceedings of the Symposium on Power Sources for Biomedical Implantable Applications* that low molecular weight poly(2-vinylpyridine) may be used (see page 146). The resultant material is described as being "tar-like". A solid material is also described, presumably the result of using a different molecular weight polymer. The Schneider U.S. Pat. No. 4,148,975 discusses this subject matter in more detail pointing out that commercial grades of poly(2-vinylpyridine) having molecular weights of 6000-13000 as well as lower molecular weights may be used in forming the cathode materials.

A document entitled "The Lithium-Iodine Cell For Medical and Commercial Applications" by Schneider, Harney and Harney, available from Catalyst Research Corporation also describes these tar-like and solid materials. Preparation by heating the iodine-polymer mixture between 100° C. (212° F.) and 200° C. (390° F.) for several days is described.

Poly(2-vinylpyridine) is commercially available from the Ionac Chemical Company, Birmingham, Alabama: typical weight-average molecular weight—301,000; typical number-average molecular weight—128,000. This polymer may be used to make the cathode material.

On the other hand, the polymer may also be synthesized for use in these cathode materials as follows:

Benzoyl peroxide (2.0 grams) is dissolved in freshly distilled 2-vinylpyridine (200 grams). Water (400 ml) is added and the mixture is purged with nitrogen for 1 hour. With continued purging, the mixture is heated at 85° C. (184.5° F.) with stirring and kept at that temperature for 2 hours. The organic phase thickens and develops a brown color during this time. The mixture is cooled; the aqueous phase is discarded and the organic phase is dried overnight at 60° C. (140° F.) in a vacuum oven. The residue is ground into fine granuals and dried to a constant weight at 60° C. (140° F.) in a vacuum oven. The yield is about 162 grams (81%) poly(2-vinylpyridine). This product can be expected to provide the following results upon analysis by gel permeation chromatography:

weight-average molecular weight—555,000. Number-average molecular weight—199,000.

It can be seen from the above discussion of the prior art that iodine-poly(2-vinylpyridine) cathode materials may be prepared in various physical forms and utilizing differing molecular weight polymer. Moreover, it has become generally accepted that only relatively low amounts of iodine can be included in the conventionally prepared material; the highest amount being 36:1 as per the Schneider U.S. Pat. No. 3,674,562 whereas the more typical production material utilizes a 20:1 weight ratio of iodine to poly(2-vinylpyridine). That is, less than about 96-97% by weight iodine has been the upper limit of the iodine content of these materials as prepared by conventionally accepted procedures i.e., with heating below about 150° C. (300° F.). Only the Phillips U.S. Pat. No. 4,157,433 utilizes higher amounts of iodine with the polymer but it requires heating at much higher temperatures i.e., in excess of 150° C. (300° F.), an unconventional approach.

When relative amounts of cathode constituents are referred to herein, it is the initial amounts thereof as initially mixed together to form the initial mixture which are being described and referred to rather than any resultant mixture composition or any reaction product or products which may or may not form as a result of mixing or subsequent treatment.

BRIEF SUMMARY OF THE INVENTION

In accordance with the present invention, it has been discovered that useful cathode materials containing unusually large amounts of iodine i.e., greater than about 40:1 (amount 97% by weight iodine) may be prepared utilizing the more conventional low temperature heating i.e., utilizing heating temperatures in the area of about 65° C. (150° F.) to about 150° C. (300° F.).

This invention provides such cathode materials utilizing "high proportions" of uncomplexed iodine without any objectionable increase in cell resistance expected from the Moser patent teaching. Surprisingly, such cells operate as well as the more conventional ones when they were not expected to. It has been discovered that functional lithium/iodine cells having at least about 97% by weight iodine (overall), balance substantially poly(2-vinylpyridine), operate satisfactorily. In fact, satisfactory cells having over 99% by weight iodine, balance poly(2-vinylpyridine), have been prepared and found to operate satisfactorily.

The importance of being able to use high percent iodine and less poly(2-vinylpyridine) in the cathode material lies in the fact that it allows one to replace the poly(2-vinylpyridine) in the cathode material with more iodine thus increasing the capacity of the material for the same volume. The capacity advantage of replacing the P2VP with iodine for a given volume, comes not only from the additional percentage of iodine by weight in the material but also from the very significant density increase with the increasing amount of iodine. As the density of the mixture becomes nearer that of pure iodine, there is a greater than linear change in capacity with increasing percentage of iodine composition. The lower concentration of poly(2-vinylpyridine) is also advantageous because less iodine is chemically combined or "tied up" in complex form with the poly(2-vinylpyridine). Therefore, more iodine is available to be utilized electrochemically. This means that the improved cathode material of the invention offers higher capacity per unit volume material prepared in a conventional manner for cells than has heretofore been available at acceptable internal cell resistances. Moreover, the life of cells using the improved cathode materials is extended.

DETAILED DESCRIPTION OF THE INVENTION

For descriptive purposes herein, the term "complex" refers to any single phase iodine and poly(2-vinylpyridine) mixture. The term "cathode material" refers to a material composed of a "complex" and includes excess iodine present as a solid phase, the overall amount of initial iodine contained in the material being expressed in terms of weight percent, as is the overall amount of the initial poly(2-vinylpyridine). Relative amounts of these two components are also expressed in terms of weight ratio. Poly(2-vinylpyridine) may be abbreviated as P2VP.

Figure 1:
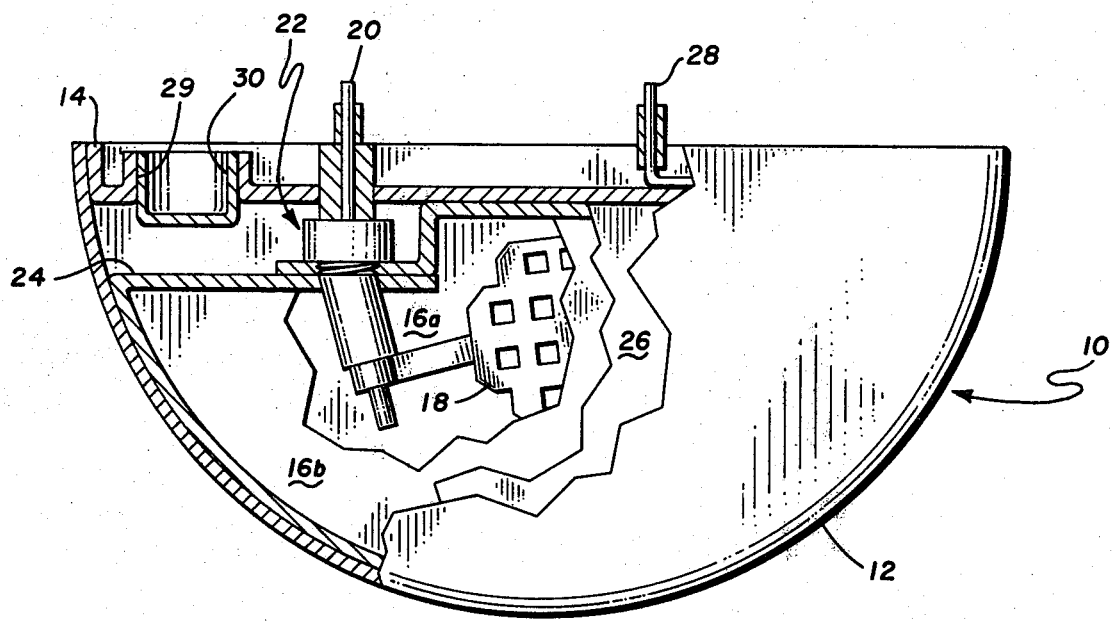
FIG. 1 comprises an elevational view, with various parts broken away for clarity, of an electrochemical cell incorporating the improved cathode material of this invention.

Referring to FIG. 1, an electrochemical cell 10 is shown schematically in FIG. 1 of the drawing. Cell 10 is comprised of a stainless steel container 12 closed by a stainless steel lid or header 14 which is welded thereto for hermetically sealing the cell. Contained within the cell is a lithium anode 16 comprised of a pair of lithium elements 16a and 16b which are pressure bonded together and contain an anode collector 18 sandwiched therebetween. Metals other than lithium such as silver or magnesium may be used for the anode. Also alloys such as lithium alloys and the like may be used. Anode collector 18 may be of any suitable metal such as nickel. Electrical contact is made to anode collector 18 by means of lead 20 which extends into container 12 by means of an insulating feedthrough arrangement generally indicated at 22. Feedthrough 22 may be of an injection molded plastic, for example. Lithium anode 16 is held within a frame member or retaining band 24 which is preferably of an insulating plastic material such as fluoropolymer material. One fluoropolymer material which is readily available is "Halar" a trademark of the Allied Chemical Company. Other non-reactive materials may be used for feedthrough 22 and retaining band 24. Retaining band 24 also serves to insulate anode 16 from stainless steel container 12. The remainder of the internal volume of container 12 is filled with the improved iodine-poly(2-vinylpyridine) cathode material 26 of the invention. Electrical contact is made to cathode material 26 by means of lead 28 which contacts container 12 via header 14, container 12 being in contact with material 26.

The cathode material may be prepared by heating the poly(2-vinylpyridine) and iodine mixture, or the poly(2-vinylpyridine) can be heated with lesser amounts of iodine followed by subsequent addition of appropriate amounts of iodine, in the conventional manner i.e., to a temperature greater than the crystallization temperature of iodine but below about 150° C. (300° F.). For example, heating to 200° F. to 300° F. is satisfactory and it may be maintained for several hours or days. Various combinations of times and temperatures within these ranges may be used as previously described hereinabove. The resulting mixture while at temperature is a flowable substance which may be poured into the cell through port 29 and which substantially solidifies into a relatively solid material upon cooling. Port 29 is closed with a suitable hermetic plug 30, which may be of stainless steel and welded after container 12 has been substantially filled.

Although not shown in the Figure, it is preferred that the surface of the lithium anode be coated with a layer of poly(2-vinylpyridine) before being incorporated into the cell. This is more fully described in U.S. Pat. No. 3,957,533 and U.S. Pat. No. 4,071,662, both to Mead et al. Alternatively, a self-supporting film of poly(2-vinylpyridine) may be placed against the anode surfaces. This is more fully described in U.S. Pat. No. 4,182,798 to Skarstad, assigned to the same assignee as this invention. Briefly, the poly(2-vinylpyridine) on the anode may be applied by painting a coating of the polymer dissolved in tetrahydrofuran at room temperature or by applying the self-supporting polymer film during the anode pressing operation. Ionac PP2000 obtained from Ionac Chemical Co. of Birmingham, Ala. is an example of such a coating polymer. The content of the patents referred to is incorporated herein by reference.

A spontaneous formation of lithium iodide (not shown) occurs when the cathode material is placed into contact with the operative surface of the lithium anode. The lithium iodide functions as the electrolyte of the cell. Optionally, an initial film of lithium iodide may be formed on the anode prior to fabrication of the cell.

Examples of a variety of high capacity cathode materials of the invention were prepared and tested in cells of the type shown in FIG. 1. The cathode materials were all prepared by heating the constituents together for 24 hours at a temperature of about 125° C. followed by 24 hours at about 150° C. However, any heating treatment below about 150° C. may be used as pointed out above. Some of these materials are described in the Tables included hereinbelow. Since some iodine tends to be lost during the material preparation, the initial starting amount is usually referred to as a "nominal amount" or "nominal ratio" while the actual amount realized may be somewhat less and is usually referred to as the "real amount" or "real ratio". The loss is not substantial as can be seen from Table I, which is exemplary.

TABLE I

| Nominal Ratio | Wt. I$_2$ Wt. P2VP | Calc. Ratio | Weight Loss | Real Ratio |
|---|---|---|---|---|
| 30:1 | 1200g. 40g. | 30:1 | 12.2g. | 29.7:1 |
| 50:1 | 1000g. 20g. | 50:1 | 20.5g. | 49:1 |

For convenience, the following Table II is included for referring equivalent weight ratios of iodine to percent weight ratios of iodine, as both are used herein.

TABLE II

| Wt. Ratio I$_2$:P2VP | % Wt. I$_2$/Bal P2VP | Mole Ratio I$_2$:Pyridine Unit |
|---|---|---|
| 20:1 | 95.2% | 8.3:1 |
| 40:1 | 97.5% | 16.5:1 |
| 50:1 | 98.0% | 20.7:1 |
| 100:1 | 99.0% | 41.3:1 |
| 200:1 | 99.5% | 82.6:1 |
| 300:1 | 99.7% | 124:1 |

The striking increase in capacity is clearly demonstrated when one considers increasing mole ratios of Table II with increasing amounts of iodine.

Table III provides several examples of 20:1 and 50:1 ratio cathode material. The 20:1 ratio is regarded as being substantially representative of the conventional material, having about 95% iodine while the 40:1 and higher weight ratios are regarded as being representative of cathode material of the invention. Initial OCV and cell resistance (ohms) are reported for these cells. Some of the cells incorporated anodes coated typically with about 70–75 milligrams P2VP polymer while some were uncoated. The amount of polymer coating may vary considerably, not being critical.

TABLE III

| Cell | Lithium Weight (g) | Cathode Weight (g) | Coated Anode | OCV(V) | Cell Resistance (ohms) |
|---|---|---|---|---|---|
| 20:1 | 1.16 | 12.96 | No | 2.81 | 31.6 |
| 20:1 | 1.16 | 12.56 | No | 2.81 | 28.8 |
| 20:1 | 1.17 | 13.28 | No | 2.81 | 21.3 |
| 20:1 | 1.14 | 13.43 | No | 2.81 | 26.7 |
| 20:1 | 1.14 | 13.44 | Yes | 2.79 | 21.2 |
| 20:1 | 1.16 | 13.30 | Yes | 2.79 | 21.2 |
| 20:1 | 1.15 | 13.16 | Yes | 2.80 | 32.4 |
| 20:1 | 1.17 | 13.43 | Yes | 2.79 | 25.7 |
| 20:1 | 1.17 | 13.48 | Yes | 2.79 | 24.1 |
| 20:1 | 1.17 | 13.38 | Yes | 2.79 | 26.5 |
| 20:1 | 1.13 | 13.89 | Yes | 2.79 | 28.8 |
| 20:1 | 1.14 | 13.07 | Yes | 2.79 | 18.8 |
| 50:1 | 0.740 | 12.768 | Yes | 2.78 | 328 |
| 50:1 | 0.717 | 12.906 | Yes | 2.78 | 162 |
| 50:1 | 0.738 | 12.714 | Yes | 2.79 | 842 |
| 50:1 | 0.711 | 13.286 | Yes | 2.79 | 640 |
| 50:1 | 0.733 | 13.236 | Yes | 2.79 | 539 |
| 50:1 | 0.727 | 13.030 | Yes | 2.79 | 293 |
| 50:1 | 0.725 | 13.520 | Yes | 2.78 | 170 |
| 50:1 | 0.711 | 13.194 | Yes | 2.78 | 339 |
| 50:1 | 0.717 | 13.044 | Yes | 2.78 | 752 |
| 50:1 | 0.732 | 13.227 | Yes | 2.79 | 396 |
| 50:1 | 0.698 | 12.994 | Yes | 2.79 | 406 |
| 50:1 | (Nominal 1.48) | 5.263 | No | 2.80 | 686 |
| 50:1 | (Nominal 1.48) | 8.307 | No | 2.80 | 313 |
| 50:1 | (Nominal 1.48) | 6.284 | No | 2.80 | 287 |
| 50:1 | (Nominal 1.48) | 5.850 | No | 2.80 | 498 |
| 50:1 | (Nominal 1.48) | 6.617 | No | 2.80 | 201 |
| 50:1 | (Nominal 1.48) | 7.353 | No | 2.80 | 200 |
| 50:1 | (Nominal 1.48) | 7.314 | No | 2.80 | 227 |

Table IV provides examples of cells prepared having 100:1 nominal cathode material with electrical data therefor.

TABLE IV

| Cell | Lithium Weight (g) | Cathode Weight (g) | Coated Anode | OCV(V) | Cell Resistance (ohms) |
|---|---|---|---|---|---|
| 100:1 | 0.697 | 14.034 | Yes | 2.78 | 3.39K |
| 100:1 | 0.658 | 14.279 | Yes | 2.78 | 5.45K |
| 100:1 | 0.669 | 14.137 | Yes | 2.78 | 4.11K |
| 100:1 | 0.665 | 14.147 | Yes | 2.78 | 3.51K |
| 100:1 | 0.783 | 14.416 | Yes | 2.78 | 4.04K |
| 100:1 | 0.588 | 14.416 | No | 2.80 | 1.14K |
| 100:1 | 0.585 | 14.357 | No | 2.80 | 1.80K |
| 100:1 | 0.614 | 14.103 | No | 2.80 | 4.12K |
| 100:1 | 0.682 | 14.348 | No | 2.80 | 6.78K |
| 100:1 | 0.580 | 14.405 | No | 2.80 | 2.82K |

Variations in resistance may depend on the cooling conditions encountered when the cathode material is poured into the cell.

Table V provides examples of cells having 200:1 and 300:1 nominal cathode material with electrical data therefor.

TABLE V

| Cell | Lithium Weight (g) | Cathode Weight (g) | Coated Anode | OCV(V) | Cell Resistance (ohms) |
|---|---|---|---|---|---|
| 200:1 | 0.66 | 12.752 | Yes | 2.76 | 29.0K |
| 200:1 | 0.66 | 12.969 | Yes | 2.77 | 23.9K |
| 200:1 | 0.67 | 12.404 | Yes | 2.78 | 10.7K |
| 200:1 | 0.67 | 12.483 | Yes | 2.78 | 20.2K |
| 200:1 | 0.67 | 12.640 | Yes | 2.77 | 28.2K |
| 200:1 | 0.68 | 14.755 | No | 2.81 | 2.02K |
| 200:1 | 0.68 | 14.167 | No | 2.80 | 4.03K |
| 200:1 | 0.67 | 14.301 | No | 2.80 | 3.70K |
| 200:1 | 0.68 | 14.750 | No | 2.81 | 3.26K |
| 200:1 | 0.68 | 14.047 | No | 2.80 | 3.53K |
| 300:1 | (Nominal 1.48) | 8.293 | No | 2.79 | 9.62K |
| 300:1 | (Nominal 1.48) | 8.297 | No | 2.79 | 7.98K |
| 300:1 | (Nominal 1.48) | 8.463 | No | 2.79 | 7.02K |
| 300:1 | (Nominal 1.48) | 8.366 | No | 2.79 | 9.82K |
| 300:1 | (Nominal 1.48) | 8.311 | No | 2.80 | 9.08K |

Figure 2:
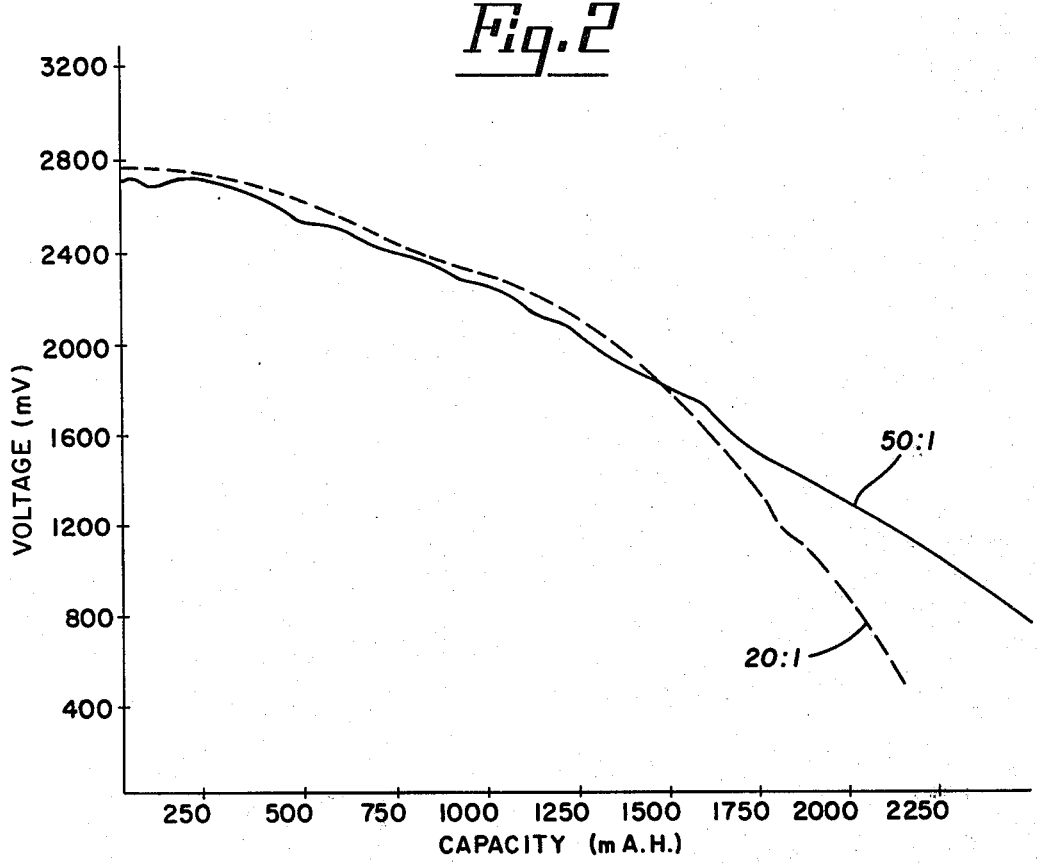
FIG. 2 is a graph showing voltage plotted versus capacity for cells using the cathode material of the invention for cells with more conventional cathode material.
Figure 3:
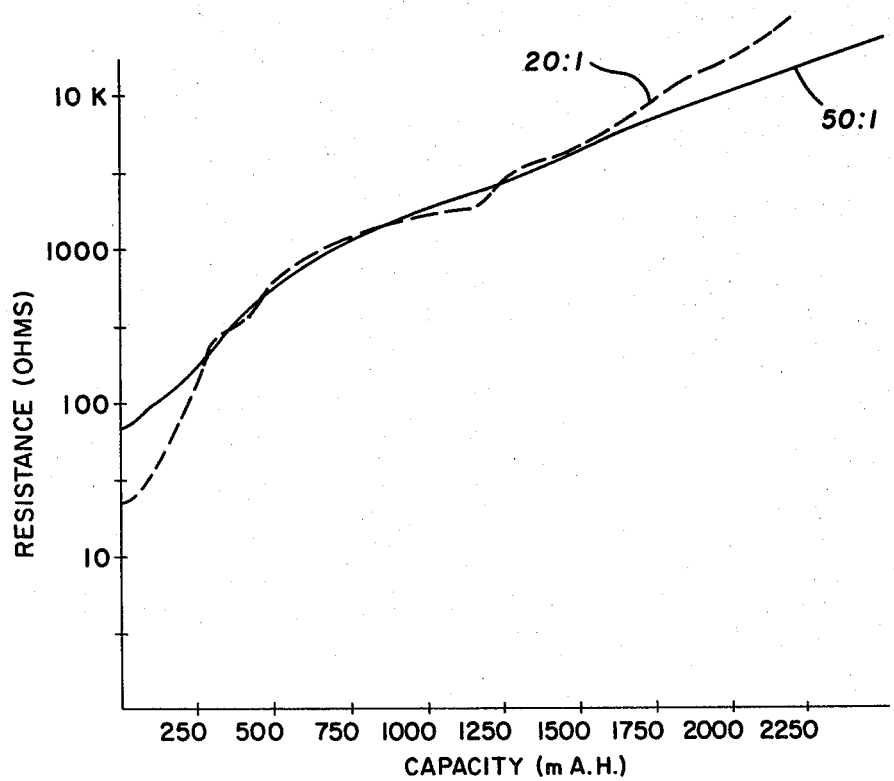
FIG. 3 is a graph showing resistance plotted versus capacity for cells using the cathode material of the invention and cells with more conventional cathode material.

A voltage vs. capacity curve (FIG. 2) and an impedance (internal resistance) vs. capacity curve (FIG. 3) showing accelerated discharge at about 20 microamps per square centimeter are included to demonstrate increased capacity and thereby projected longer life for cells using the cathode material of the invention as compared to cells using a more conventional cathode material (FIG. 2) and to demonstrate acceptable internal resistance (FIG. 3) of the cathode materials of the invention (50:1 shown) as compared to the more conventional materials (20:1 as shown). The cells included comparable size polymer coated lithium anodes. The stoichiometric iodine capacity (per weight of iodine) was 3236 mAH for the 50:1 cells and 2887 mAH for the 20:1 cells. Internal resistance was measured by AC techniques with a 1000 cycle bridge.

Having described the invention by way of illustration, it is to be defined by the following claims.

We claim:

1. An electrochemical cell comprising: an anode and a cathode, the cathode comprising an initial constituent mixture containing greater than about 97% by weight and less than 100% by weight iodine, balance consisting essentially of poly(2-vinylpyridine), the poly(2-vinylpyridine) being complexed with some of the iodine and wherein the iodine and poly(2-vinylpyridine) mixture is treated by heating below about 150° C. (300° F.).

2. The cell of claim 1 wherein the amount of iodine is at least about 97.5% by weight.

3. The cell of claim 1 wherein the temperature is between about 65° C. (150° F.) and 150° C. (300° F.).

4. The cell of claim 1 wherein the anode is lithium.

5. The cell of claim 1 wherein the cell further includes poly(2-vinylpyridine) interposed between the anode and the cathode.

6. The cell of claim 5 wherein the poly(2-vinylpyridine) layer is in the form of a coating on at least the operative surface of the anode.

7. The cell of claim 5 wherein the poly(2-vinylpyridine) is in the form of a self-supporting body interposed between the anode and the cathode.

8. The cell of claim 1 wherein heating of the material is at more than one temperature below about 150° C. (300° F.).

9. Improved cathode material comprising: an initial constituent mixture containing greater than about 97% by weight and less than 100% by weight iodine, balance consisting essentially of poly(2-vinylpyridine) complexed with some of the iodine and wherein the iodine and poly(2-vinylpyridine) mixture is treated by heating below about 150° C. (300° F.).

10. The cathode of claim 9 wherein the amount of the iodine is at least about 97.5% by weight.

11. The cathode of claim 9 wherein the temperature is between about 65° C. (150° F.) and 150° C. (300° F.).

12. Improved cathode material comprising an initial mixture of greater than about 97% and less than 100% by weight iodine, balance essentially poly(2-vinylpyridine) wherein the mixture has been treated by heating below about 150° C. (300° F.).

13. The material of claim 12 wherein heating of the mixture is at more than a single temperature below about 150° C. (300° F.).

14. The cathode mixture of any of claims 1, 9 or 12 wherein the mixture is heated more than a single time during its preparation.

* * * * *